United States Patent
Scott et al.

(10) Patent No.: US 12,018,380 B2
(45) Date of Patent: Jun. 25, 2024

(54) METALLIC SUBSTRATE TREATMENT METHODS AND ARTICLES COMPRISING A PHOSPHONATE FUNCTIONALIZED LAYER

(71) Applicant: HOWMET AEROSPACE INC., Pittsburgh, PA (US)

(72) Inventors: Ryan N. Scott, Plum, PA (US); Kevin M. Robare, New Kensington, PA (US); Jennifer L. Giocondi, Pittsburgh, PA (US); Nicola Menegazzo, Pittsburgh, PA (US); Kelly M. Weiler, Oakmont, PA (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 288 days.

(21) Appl. No.: 17/433,312

(22) PCT Filed: Dec. 18, 2019

(86) PCT No.: PCT/US2019/067014
§ 371 (c)(1),
(2) Date: Aug. 24, 2021

(87) PCT Pub. No.: WO2020/180386
PCT Pub. Date: Sep. 10, 2020

(65) Prior Publication Data
US 2022/0145471 A1     May 12, 2022

Related U.S. Application Data (60) Provisional application No. 62/812,334, filed on Mar. 1, 2019.

(51) Int. Cl.
*C23C 22/07*     (2006.01)
*B05D 7/14*     (2006.01)
(Continued)

(52) U.S. Cl.
CPC ............... *C23C 22/07* (2013.01); *B05D 7/14* (2013.01); *C23C 22/73* (2013.01); *C23C 22/76* (2013.01); *C23G 1/125* (2013.01); *C23G 1/22* (2013.01)

(58) Field of Classification Search
None
See application file for complete search history.

(56) References Cited

U.S. PATENT DOCUMENTS 3,630,790 A    12/1971   Schmidt et al.
5,103,550 A     4/1992   Wefers et al.
(Continued)

FOREIGN PATENT DOCUMENTS

DE      19654642 A1    9/1998
EP       0122129 B1     8/1989
(Continued)

OTHER PUBLICATIONS

ChemBK, "Phenylphosphonic acid", https://www.chembk.com/en/chem/Phenylphosphonic%20acid, accessed Oct. 4, 2023 (Year: 2023).*
(Continued)

*Primary Examiner* — Shamim Ahmed
*Assistant Examiner* — Bradford M Gates
(74) *Attorney, Agent, or Firm* — K&L Gates LLP (57) ABSTRACT

Metallic substrate treatment methods and articles comprising a phosphonate functionalized layer are provided. The method comprises contacting a metallic substrate comprising at least one of aluminum and an aluminum alloy with a fluid to form a phosphonate functionalized layer on at least a region of the metallic substrate. The fluid comprises at least one of a phosphonate containing acid and a derivative thereof. At least one of the phosphonate containing acid and the derivative thereof comprises a pKa of a first acidic proton. The fluid comprises a pH at least 0.5 pH value
(Continued)

greater than the pKa of the first acidic proton. The article comprises a metallic substrate comprising aluminum or an aluminum alloy and a phosphonate functionalized layer on at least a region of the metallic substrate.

14 Claims, 5 Drawing Sheets

(51) Int. Cl.
*C23C 22/73* (2006.01)
*C23C 22/76* (2006.01)
*C23G 1/12* (2006.01)
*C23G 1/22* (2006.01)

(56) References Cited

U.S. PATENT DOCUMENTS

| | | | |
|---|---|---|---|
| 5,354,494 A * | 10/1994 | Gunagan | C09D 4/00 510/513 |
| 5,728,233 A | 3/1998 | Keda et al. | |
| 10,106,689 B2 | 10/2018 | Wolpers et al. | |
| 2003/0082391 A1 | 5/2003 | Goodreau et al. | |
| 2006/0131544 A1 | 6/2006 | Scholer | |
| 2006/0151070 A1 | 7/2006 | Rodzewich et al. | |
| 2008/0108537 A1 | 5/2008 | Rees | |
| 2008/0127859 A1 | 6/2008 | Kolberg et al. | |
| 2008/0164151 A1 * | 7/2008 | Ohmi | C25D 21/12 205/324 |
| 2008/0245444 A1 * | 10/2008 | Rodzewich | C23C 22/34 148/247 |
| 2009/0053552 A1 | 2/2009 | De Gans et al. | |
| 2013/0296195 A1 * | 11/2013 | Gray | B01J 19/0046 506/18 |
| 2019/0136385 A1 | 5/2019 | Kamimura et al. | |

FOREIGN PATENT DOCUMENTS

| | | |
|---|---|---|
| EP | 2246124 A1 | 11/2010 |
| JP | 2015-134957 A | 7/2015 |
| JP | 2016-98397 A | 5/2016 |
| JP | 2008-231418 A | 10/2018 |
| WO | 2016/129640 A1 | 8/2016 |
| WO | 2017/188108 A1 | 11/2017 |
| WO | 2019036062 A1 | 2/2019 |

OTHER PUBLICATIONS

International Search Report and Written Opinion of the International Searching Authority for International Application No. PCT/US2019/067014 mailed Apr. 21, 2020.
Phosphorous Acid—Wikipedia. [retrieved from the internet on Jun. 6, 2022], URL: https://en.wikipedia.org/w/index.php?title=Phosphorous_acid&oldid=863613432, Published Oct. 11, 2018.
Jaffe, et al., "The Acid Dissociation Constants of Aromatic Phosphonic Acids", I. Meta and Para Substituted Compounds, Journal of the American Chemical Society, vol. 75, Issue 9, pp. 2209-2211, [retrieved from the Internet on Jun. 6, 2022], URL: https://pubs.acs.org/doi/10.1021/ja01105a054, Published May 1, 1953.
Freedman, et al., "The Preparation and Properties of Phosphonic Acids", Chemical Reviews, vol. 57, Issue 3, pp. 479-523, [retrieved from the internet on Jun. 6, 2022], URL: https://pubs.acs.org/doi/10.1021/cr50015a003, Published Jun. 1, 1957.

* cited by examiner

Metallic Substrate Sample A

Metallic Substrate Sample B

Metallic Substrate Sample C

Metallic Substrate Sample D

FIG. 3

Metallic Substrate Sample N

Metallic Substrate Sample O

FIG. 4A

Metallic Substrate Sample N

Metallic Substrate Sample O

FIG. 4B

METALLIC SUBSTRATE TREATMENT METHODS AND ARTICLES COMPRISING A PHOSPHONATE FUNCTIONALIZED LAYER

CROSS-REFERENCE

This application claims priority to U.S. Provisional Patent Application No. 62/812,334, which was filed on Mar. 1, 2019. The contents of which is incorporated by reference into this specification.

FIELD OF USE

The present disclosure relates to metallic substrate treatment methods and articles comprising a phosphonate functionalized layer.

BACKGROUND

Metallic substrates can be subjected to various surface treatments. The surface treatments can impart different properties to the surface of the metallic substrates. Designing a durable and aesthetically desirable surface treatment presents challenges.

SUMMARY

In one aspect, a metallic substrate treatment method is provided. The method comprises contacting a metallic substrate comprising at least one of aluminum and an aluminum alloy with a fluid to form a phosphonate functionalized layer on at least a region of the metallic substrate. The fluid comprises at least one of a phosphonate containing acid and a derivative thereof. The at least one of the phosphonate containing acid and the derivative thereof comprises a pKa of a first acidic proton. The fluid comprises a pH at least 0.5 pH value greater than the pKa of the first acidic proton.

In another aspect, an article is provided. The article comprises a metallic substrate comprising aluminum or an aluminum alloy and a phosphonate functionalized layer on at least a region of the metallic substrate.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Various examples are described and illustrated herein to provide an overall understanding of the structure, function, and use of the disclosed articles and methods. The various examples described and illustrated herein are non-limiting and non-exhaustive. Thus, an invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, the term "phosphonate" refers to phosphorus compounds that comprise a phosphorous atom coordinated with three oxygen atoms. One of the three oxygen atoms can be coordinated to the phosphorous atom by a double bond. A phosphonate does not comprise phosphoric acid ($H_3O_4P$). For example, a phosphonate can comprise the general Formula (I), wherein $R_1$, $R_2$, and $R_3$ are individually selected from hydrogen, an alkyl, or an aryl. As such, $R_1$, $R_2$, and $R_3$ can be the same or different groups.

Formula (I)

Selecting a surface treatment can require, for example, a balancing of desired adhesion, corrosion protection, and aesthetic properties. According to the present disclosure, a metallic substrate treatment method is provided that can promote adhesion of a top coat to a metallic substrate, provide corrosion protection properties to a metallic substrate, and provide a desired aesthetic appearance of the metallic substrate. Additionally, the present disclosure provides articles comprising a phosphonate functionalized layer. Articles including the phosphate functionalized layer thereon can exhibit adherence of a top coat to the article, comprise improved corrosion resistance, improved abrasion resistance, and/or have a desirable aesthetic appearance.

A metallic substrate treatment method according to the present disclosure comprises contacting a metallic substrate with a fluid comprising a composition that can form a phosphonate functionalized layer on at least a region of the metallic substrate. Contacting the metallic substrate can comprise at least one of immersing the metallic substrate in a bath of the fluid, spraying the fluid onto the metallic substrate, and wiping the metallic substrate with the fluid. In certain embodiments in which contacting the metallic substrate comprises immersing the metallic substrate in a bath of the fluid, the bath of fluid can be agitated. For example, the fluid bath can be agitated by at least one method selected from the group consisting of bubbling gas through the fluid in the bath and stirring the fluid (e.g., circulating the fluid with a pump, stirring the fluid with an impeller).

In various embodiments of the method, the fluid can contact the metallic substrate for at least 1 second, such as, for example, at least 5 seconds, at least 10 seconds, at least 30 seconds, at least 1 minute, at least 5 minutes, at least 10 minutes, at least 20 minutes, or at least 30 minutes. The fluid can contact the metallic substrate for no greater than 40 minutes, such as, for example, no greater than 30 minutes, no greater than 20 minutes, no greater than 10 minutes, no greater than 5 minutes, no greater than 1 minute, no greater than 30 second, no greater than 10 second, or no greater than 5 seconds. In certain embodiment of the method, the fluid can contact the metallic substrate for a time in a range of 1 second to 40 minutes, such as, for example, 2 seconds to 10 minutes, 5 second to 10 minutes, 5 seconds to 5 minutes, 5 seconds to 2 minutes, or 10 seconds to 30 seconds. The fluid can react with the metallic substrate during the contact time.

The fluid can comprise at least one of a phosphonate containing acid and a derivative thereof. For example, in certain embodiments the phosphonate containing acid can be at least one of phosphorous acid ($H_3O_3P$), phenyl phosphonic acid ($C_6H_7O_3P$), ethylphosphonic acid ($C_2H_7O_3P$), octylphosphonic acid ($C_8H_{19}O_3P$), octadecylphosphonic acid ($C_{18}H_{39}O_3P$), vinylphosphonic acid ($C_2H_5O_3P$), vinylphosphonic acid dimethyl ester ($C_4H_{10}O_3P$), diethylenetriaminepentakis(methylphosphonic acid) ($CH_5O_3P$), octane diphosphonic acid ($C_8H_{20}O_6P_2$), and derivatives of any of these compounds. A derivative of a phosphonic acid can be, for example, a deprotonated phosphonic acid (e.g., a deprotonated derivative thereof, a conjugate base) and/or an at least twice protonated phosphonic acid. For example, the derivative of the phosphonic acid can comprise at least one of a deprotonated phosphorous acid ($H_2O_3P^-$), a deprotonated phenyl phosphonic acid ($C_6H_6O_3P^-$), a deprotonated ethylphosphonic acid ($C_2H_6O_3P^-$), a deprotonated octylphosphonic acid ($C_8H_{18}O_3P^-$), a deprotonated octadecylphosphonic acid ($C_{18}H_{38}O_3P^-$), a deprotonated vinylphosphonic acid ($C_2H_4O_3P^-$), a deprotonated vinylphosphonic acid dimethyl ester ($C_4H_9O_3P^-$), a deprotonated diethylenetriaminepentakis(methylphosphonic acid) ($CH_5O_3P^-$), and a deprotonated octane diphosphonic acid ($C_8H_{19}O_6P_2^-$).

The phosphonate containing acid and/or the derivative thereof can comprise a pKa (e.g., $-\log_{10}$ of the acid dissociation constant, Ka) of a first acidic proton. The pKa of the first acidic proton corresponds to a pH at which substantially equal concentrations of phosphonate containing acid and its corresponding conjugate base (e.g., deprotonated phosphonate containing acid) are present in solution. Raising the pH of a solution comprising the phosphonate containing acid and/or derivative thereof above the pKa of the first acidic proton can increase the concentration of the conjugate base and decrease the concentration of the phosphonate containing acid. Lowering the pH of the solution comprising the phosphonate containing acid and/or derivative thereof below the pKa of the first acidic proton can decrease the concentration of the conjugate base and increase the concentration of the phosphonate containing acid. The conjugate base can comprise a negative charge (−1). The phosphonate containing acid can comprise a neutral charge.

In various embodiments, the phosphonate containing acid and/or the derivative thereof can comprise at least two pKas, such as, for example, a pKa of a first acidic proton and a pKa of a second acidic proton. The pKa of the second acidic proton corresponds to a pH at which substantially equal concentrations of the conjugate base and a corresponding secondary conjugate base (e.g., twice deprotonated conjugate base) are present in solution. The secondary conjugate base can comprise a negative two charge (−2). In various examples, the phosphonate containing acid and/or the derivative thereof can comprise at least three pKas. In various embodiments wherein the phosphonate containing acid and/or derivative thereof comprises phosphorous acid, the pKa of the first acidic proton can be 1.3 and the pKa of the second acidic proton can be 6.7. In various embodiments wherein the phosphonate containing acid and/or derivative thereof comprises ethylphosphonic acid, the pKa of the first acidic proton can be 2.4 and the pKa of the second acidic proton can be 8.1. In various embodiments wherein the phosphonate containing acid and/or derivative thereof comprises phenyl phosphonic acid, the pKa of the first acidic proton can be 1.8 and the pKa of the second acidic proton can be 7.1. In various embodiments wherein the phosphonate containing acid and/or derivative thereof comprises vinylphosphonic acid, the pKa of the first acidic proton can be 2.6 and the pKa of the second acidic proton can be 7.3.

The pH of the fluid used in the present method can be selected based on a desired reactivity of the phosphonate containing acid and/or derivative thereof. The pH of the fluid can be selected in order to reduce the solubility of the metallic substrate in the fluid and thereby extend the operational life of the fluid. In various embodiments, the fluid can comprise a pH at least 0.5 pH value greater than the pKa of the first acidic proton, such as, for example, at least 1 pH value greater, at least 2 pH values greater, at least 3 pH values greater, at least 4 pH values greater, at least 5 pH values greater, at least 6 pH values greater, or at least 8 pH values greater than the pKa of the first acidic proton. In certain embodiments, the fluid can comprise a pH no greater than 10 pH values greater than the pKa of the first acidic proton, such as, for example, no greater than 8 pH values greater, no greater than 6 pH values greater, no greater than 5 pH values greater, no greater than 4 pH values greater, no greater than 3 pH values greater, no greater than 2 pH values greater, no greater than 1 pH value greater, or no greater than 0.5 pH values greater than the pKa of the first acidic proton. In certain embodiments according to the present disclosure, the fluid can comprise a pH in a range of the pKa of the first acidic proton to 10 pH values greater than the pKa of the first acidic proton, such as, for example, at least 0.5 pH values greater than the pKa of the first acidic proton to 8 pH values greater than the pKa of the first acidic proton or at least 4 pH values greater than the pKa of the first acidic proton to 6 pH values greater than the first acidic proton. In some embodiments, the fluid can comprise a pH in a range of the pKa of the first acidic proton to the pKa of the second acidic proton. In various embodiments, the fluid comprises a pH wherein the phosphonate containing acid is substantially dissociated into the conjugate base.

In certain embodiments, the fluid can comprise a pH greater than 1, such as, for example, greater than 1.5, greater than 2, greater than 2.5, greater than 3, greater than 4, greater than 5, greater than 5.5, greater than 6, greater than 6.5, greater than 7, greater than 8, greater than 8.5, greater than 9, or greater than 10. For example, the fluid can comprise a pH of no greater than 12, such as, no greater than 11, no greater than 10, no greater than 9, no greater than 8.5, no greater than 8, no greater than 7, no greater than 6.5, no greater than 6, no greater than 5.5, no greater than 5, no greater than 4, no greater than 3, no greater than 2.5, or no greater than 2. In various embodiments, the fluid can comprise a pH in a range of 1 to 12, such as, for example, 1.5 to 10, 1.5 to 9, 2.5 to 8, 4 to 10, 6 to 10, 4 to 8, 6 to 8, 5.5 to 8.5, or 6.5 to 8.5.

In certain embodiment, the fluid used in the present method can be an aqueous liquid solution. For example, the fluid can comprise a phosphonate containing acid and/or derivative thereof with a balance of water and, optionally, buffers, stabilizers, surfactants, and/or other additives.

In some embodiments, the fluid can comprise at least 0.1 weight percent of the phosphonate containing acid and/or the derivative thereof, based on the total weight of the fluid, such as, for example, at least 0.5 weight percent, at least 1 weight percent, at least 2 weight percent, at least 5 weight percent, at least 10 weight percent, or at least 15 weight percent of the phosphonate containing acid and/or the derivative thereof based on the total weight of the fluid. In various embodiments, the fluid comprises no greater than 20 weight percent of the phosphonate containing acid and/or the derivative thereof based on the total weight of the fluid, such as, for example, no greater than 15 weight percent, no greater than 10 weight percent, no greater than 5 weight percent, no greater than 2 weight percent, no greater than 1 weight percent, or no greater than 0.5 weight percent of the phosphonate containing acid and/or derivative thereof based on the total weight of the fluid. In certain embodiments the fluid comprises 0.1 weight percent to 20 weight percent of the phosphonate containing acid and/or derivative thereof based on the total weight of the fluid, such as, for example, 0.2 weight percent to 10 weight percent, 0.5 weight percent to 10 weight percent, 0.2 weight percent to 5 weight percent, or 0.5 weight percent to 2 weight percent of the phosphonate containing acid and/or derivative thereof based on the total weight of the fluid.

Contacting the metallic substrate with the fluid can form a phosphonate functionalized layer on the metallic substrate. For example, oxide (e.g., aluminum oxide when the substrate includes aluminum or an aluminum alloy) present on a surface of the metallic substrate can be modified by the phosphonate containing acid within the fluid and form phosphonate functionalized layer on at least a region of the metallic substrate. The phosphonate functionalized layer can comprise a phosphonate group bonded to the metallic substrate. In various embodiments, the phosphonate group is bonded to the metallic substrate through a P—O—Al bond. In various embodiments, the phosphonate group can be bonded to an oxide group on the metallic substrate or directly to a metal atom. The phosphonate functionalized layer can improve corrosion performance of the metallic substrate and can improve adherence of a coating to the metallic substrate.

In various embodiments, the phosphonate functionalized layer does not affect, or only minimally affects, the aesthetics of the metallic substrate. For example, the International Commission on Illumination L*a*b* (CIELAB) color space lightness difference ($\Delta L^*$) between the metallic substrate without the phosphonate functionalized layer (e.g., prior to contact with fluid) and the metallic substrate including the phosphonate functionalized layer thereon (e.g., after contact with the fluid) can be minimized. In various embodiments, a CIELAB lightness difference ($\Delta L^*$) between the metallic substrate comprising the phosphonate functionalized layer and the metallic substrate without the phosphonate functionalized layer is no greater than 10, such as, for example, no greater than 8, no greater than 5, no greater than 3, no greater than 2, no greater than 1, or no greater than 0.5, as measured with a BYK-Gardner Spectro Guide 45/0 Spectrophotometer. In certain embodiments, a CIELAB lightness difference ($\Delta L^*$) between the metallic substrate comprising the phosphonate functionalized layer and the metallic substrate without the phosphonate functionalized layer is greater than 0.1, greater than 0.5, or greater than 1, as measured with a BYK-Gardner Spectro Guide 45/0 Spectrophotometer. In some embodiments, a CIELAB lightness difference ($\Delta L^*$)

between the metallic substrate comprising the phosphonate functionalized layer and the metallic substrate without the phosphonate functionalized layer is 0. In certain embodiments, a CIELAB lightness difference (ΔL*) between the metallic substrate comprising the phosphonate functionalized layer and the metallic substrate without the phosphonate functionalized layer is in a range of 0 to 10, such as, for example, 0 to 5, 0 to 3, 0 to 2, 0 to 1, or 0.1 to 2, as measured with a BYK-Gardner Spectro Guide 45/0 Spectrophotometer.

Figure 1:
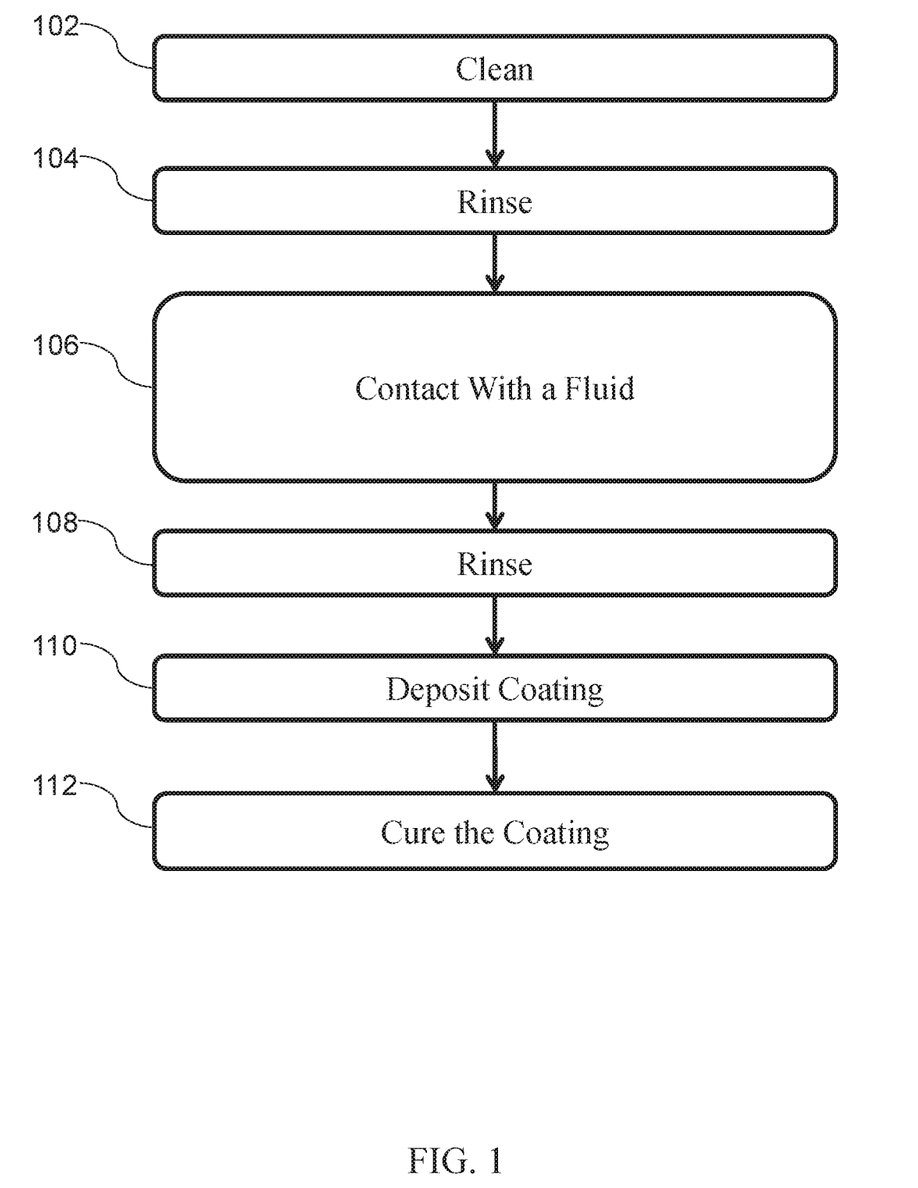
FIG. 1 is a flow chart illustrating a non-limiting embodiment of a metallic substrate coating process according to the present disclosure.

In certain embodiments herein, the metallic substrate treatment method according to the present disclosure can be incorporated into a metallic substrate coating process as shown schematically in, for example, FIG. 1. The metallic substrate coating process can comprise cleaning the metallic substrate, 102. For example, in certain embodiments the metallic substrate can be cleaned by at least one of an alkaline cleaning, acid cleaning, and a carbon dioxide based cleaning technique. In various embodiments, the metallic substrate can be rinsed to remove residual chemicals used during the cleaning 104. The rinse can comprise, for example, spraying the metallic substrate with a solution comprising water. In various embodiments, prior to cleaning the metallic substrate, the metallic substrate can be polished.

The metallic substrate can be subjected to the metallic substrate treatment method according to the present disclosure. For example, the metallic substrate can be contacted with a fluid having a composition that can form a phosphonate functionalized layer on at least a region of the metallic substrate, 106. The cleaning step 104 can occur prior to the contacting step 106. The metallic substrate can be rinsed to remove residual fluid 108. The rinse can comprise, for example, spraying the metallic substrate with water or a solution comprising water. In various embodiments, the metallic substrate can be dried.

In the embodiment illustrated in FIG. 1, a coating composition can be deposited over the phosphonate functionalized layer on the metallic substrate, 110. The coating composition can be deposited by, for example, at least one of spray coating, spin coating, dip coating, roll coating, flow coating, and film coating. The coating composition can be deposited in contact with the phosphonate functionalized layer.

As used herein, particularly in connection with coating layers or films, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a coating layer "applied over" a substrate does not preclude the presence of one or more other coating layers of the same or different composition disposed between the applied coating layer and the substrate. Likewise, for example, a second coating layer "applied over" a first coating layer does not preclude the presence of one or more other coating layers of the same or different composition located between the applied second coating layer and the applied first coating layer.

After deposition of the coating composition, the coating composition can be cured to form the coating, 112, on the metallic substrate. As used herein, the terms "cure" and "curing" refer to a chemical crosslinking of components in a curable composition and/or a chain extension of the curable composition. Accordingly, the terms "cure" and "curing" do not encompass solely physical drying of curable compositions through solvent or carrier evaporation. In this regard, the term "cured," as used in this specification, refers to the condition of a curable composition in which a component of the curable composition has chemically reacted to form a new covalent bond.

For example, curing the coating composition can comprise at least one of ambient curing, air flow, ultra violet radiation, electron beam radiation, gamma radiation, heat, and oxygen. In various embodiments, curing the coating composition can comprise a flash off of solvents in the coating composition.

In various embodiments, the coating comprises at least one of a siloxane, a silazane, a fluoropolymer, an acrylic, an epoxy, a polyester, and a polyurethane. The coating can be substantially clear, or the coating can be opaque. As used herein, the term "substantially clear" refers to a coating that produces no or minimal scattering or diffuse reflection of visible electromagnetic radiation. In certain embodiments, the coating can be colorless. In various embodiments, the coating may include a colorant, such as, for example, a pigment or a dye. In various embodiments, the coating may protect the article from, for example, abrasion and/or corrosion.

Figure 2:
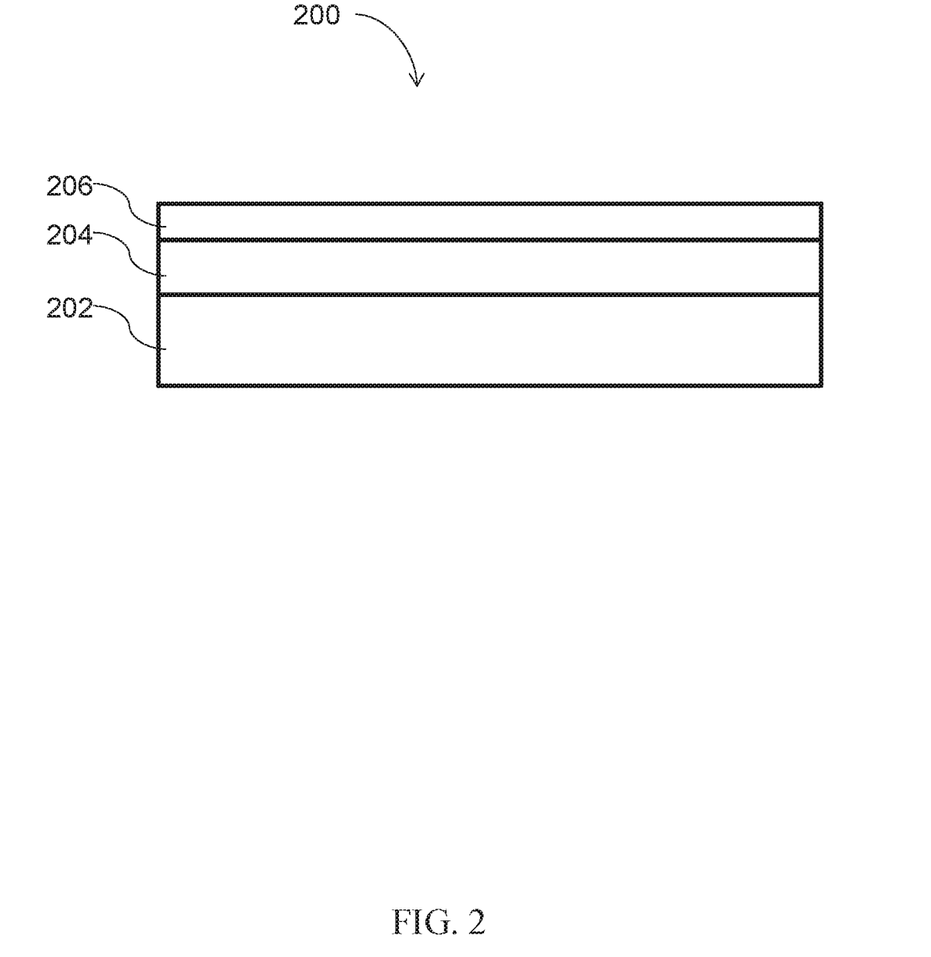
FIG. 2 is a schematic diagram of a non-limiting embodiment of an article comprising a metallic substrate and a phosphonate functionalized layer on at least a region of the metallic substrate according to the present disclosure.

FIG. 2 illustrates an article 200 comprising a metallic substrate 202 and a phosphonate functionalized layer 204 on at least a region of the metallic substrate 202. The phosphonate functionalized layer 204 can be in contact with and bound to the metallic substrate 202. A coating 206 can be deposited over at least a region of the phosphonate functionalized layer 204. The phosphonate functionalized layer 204 can be bound to the coating 206 and can be in contact with the coating 206. The phosphonate functionalized layer 204 can promote adhesion between the coating 206 and the metallic substrate 202.

In certain embodiments, the metallic substrate and the article comprising the substrate can comprise at least one of aluminum and an aluminum alloy. For example, the aluminum alloy can comprise at least one of a 1000 series aluminum alloy, a 2000 series aluminum alloy, a 3000 series aluminum alloy, a 4000 series aluminum alloy, a 5000 series aluminum alloy, a 6000 series aluminum alloy, and a 7000 series aluminum alloy. In various examples, the aluminum alloy can comprise 6061 aluminum alloy and/or 6361 aluminum alloy. In various embodiments, the aluminum alloy can comprise a 5000 series aluminum alloy with added zinc. In various embodiments, the aluminum alloy can comprise A356 and/or A357. An article including the metallic substrate comprising a phosphonate functionalized layer may be an article used in a variety of product applications such as, for example, commercial end-uses in industrial applications, in consumer applications (e.g., consumer electronics and/or appliances), or in other areas. For example, the article including a metallic substrate comprising a phosphonate functionalized layer can be utilized in at least one of the aerospace field (e.g., an aerospace component), the automotive field (e.g., an automotive component), the transportation field (e.g., a transportation component), or the building and construction field (e.g., a building component or construction component). In certain embodiments, the article including the metallic substrate comprising a phosphonate functionalized layer can be configured as at least one of an aerospace component, an automotive component, a transportation component, and a building and construction component.

In various embodiments, an article including the metallic substrate comprising a phosphonate functionalized layer can be utilized in an elevated temperature application, such as in an aerospace or automotive vehicle. In certain embodiments, an article including a metallic substrate comprising a phosphonate functionalized layer can be utilized as an engine component in an aerospace vehicle (e.g., in the form of a blade, such as a compressor blade incorporated into the engine). In other embodiments, an article including the metallic substrate comprising a phosphonate functionalized layer can be used as a heat exchanger component in the engine of an aerospace vehicle. The aerospace vehicle including the engine component/heat exchanger may subsequently be operated. In certain embodiments, an article including a metallic substrate comprising a phosphonate functionalized layer can be an automotive engine component. The automotive vehicle including such an automotive component (e.g., an engine component) may subsequently be operated. For instance, an article including a metallic substrate comprising a phosphonate functionalized layer may be used as a turbocharger component (e.g., a compressor wheel of a turbocharger, where elevated temperatures may be produced by recycling engine exhaust passing back through the turbocharger), and the automotive vehicle including the turbocharger component may be operated. In another embodiment, an article including a metallic substrate comprising a phosphonate functionalized layer may be used as a blade in a land-based (stationary) turbine for electrical power generation, and the land-based turbine included the metallic part may be operated to generate electrical power. In certain embodiments, an article including a metallic substrate comprising a phosphonate functionalized layer can be utilized in defense applications, such as in body armor or in armored vehicles (e.g., armor plating). In other embodiments, an article comprising a metallic substrate comprising a phosphonate functionalized layer can be utilized in consumer electronic applications, such as, for example, in laptop computer cases, battery cases, cell phones, cameras, mobile music players, handheld devices, computers, televisions, microwaves, cookware, washers/dryers, refrigerators, or sporting goods.

In certain embodiments, an article including a metallic substrate comprising a phosphonate functionalized layer can be utilized in a structural application, such as, for example, an aerospace structural application or an automotive structural application. For instance, an article including a metallic substrate comprising a phosphonate functionalized layer may be formed into various aerospace structural components, including, for example, floor beams, seat rails, fuselage framing, bulkheads, spars, ribs, longerons, and brackets. In various embodiments, an article including a metallic substrate comprising a phosphonate functionalized layer can be utilized in an automotive structural application. For instance, an article including a metallic substrate comprising a phosphonate functionalized layer can be formed into various automotive structural components including, for example, nodes of space frames, shock towers, and sub frames. In one embodiment, an article including a metallic substrate comprising a phosphonate functionalized layer can be a body-in-white automotive product.

In another aspect, an article including a metallic substrate comprising a phosphonate functionalized layer can be utilized in an industrial engineering application. For instance, an article including a metallic substrate comprising a phosphonate functionalized layer may be formed into various industrial engineering products, such as, for example, treadplate, tool boxes, bolting decks, bridge decks, and ramps.

In various embodiments, the metallic substrate can be a vehicle wheel or may be a portion of a vehicle wheel. The vehicle wheel can be at least one of, for example, a bonded wheel, a welded wheel, a formed wheel (e.g., vacuum formed), a cured wheel, a cast wheel, a forged wheel, and an additively manufactured wheel. The vehicle wheel may have been subjected to further processing to provide the final vehicle wheel such as machining or polishing.

Examples

Samples A-S comprising a metallic substrate of 6000 series aluminum alloy were prepared and polished. Samples A-S were contacted with phosphorous acid solution (e.g., fluid comprising a phosphonate containing acid and/or a derivative thereof) to produce a phosphonate functionalized layer thereon. The phosphorous acid solution comprised a range of 0.5 weight percent to 2 weight percent of phosphorous acid (available as a 98%, extra pure, powder from Thermo Fisher Scientific, Waltham, Massachusetts) with a balance of water.

Figure 3:
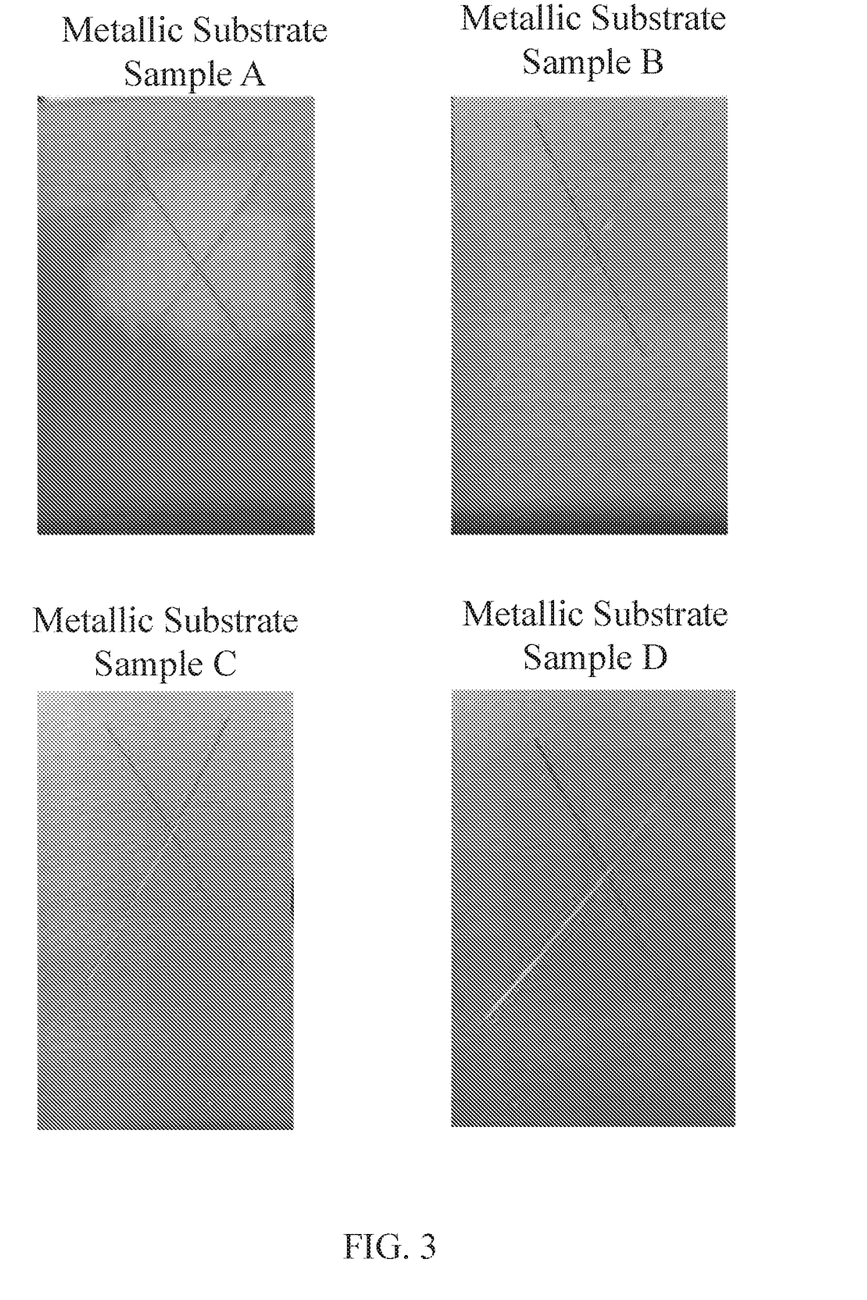
FIG. 3 provides images illustrating portions of Samples A-D after thermal shock exposure.

Samples A and B were exposed to a 0.6 weight percent phosphorous acid solution at pH 1.5 for 1 and 3 minutes respectively. Samples C and D were exposed to a 0.6 wt % solution at pH 6.5 for 1 and 3 minutes respectively. Thereafter, Samples A-D were coated with a siloxane coating and tested for adhesion performance. Adhesion performance was tested by scribing the coating with an "X" shape through to the metallic substrate with a blade to expose the underlying metallic substrate. Adhesion of the coating to the metallic substrate was assessed by thermal shock according to GM 9525P such that the samples underwent a single water soak/freeze/thaw (steam exposure) cycle. A portion of each Sample A-D including the "X" shaped scribe is shown in FIG. 3 after the thermal shock exposure. Sample A showed a large loss of adhesion as evidenced by the lost coating around the center of the "X" shaped scribe on Sample A and Sample B showed a loss of adhesion as evidenced by a chip in the coating proximal to the upper right section of the "X" shaped scribe on Sample B. No loss of adhesion was observed for Sample C and Sample D. Thus, Samples C and D had improved coating adhesion compared to Examples A and B. It is believed that other metallic substrate pretreatment methods according to the present disclosure can also achieve an improvement in adhesion performance.

Samples E-M were contacted with a 0.5 weight percent phosphorous acid solution comprised or a 2 weight percent phosphorous acid solution. Thereafter, Samples E-M were coated with a siloxane coating. The corrosion resistance of the Samples E-M was tested for filiform track formation. The filiform track formation testing was conducted by scribing a line 1.5 inches in length through the coating with a blade to expose the underlying metallic substrate. The Samples E-M were then exposed to Copper-Accelerated Acetic Acid-Salt Spray (Fog) testing (CASS Test) according to ASTM B368-09 (2014). After the CASS test, the longest filiform track-length (e.g., filament-like corrosion originating from the scribe) of each of Samples E-M was measured under a microscope with a ruler. The corrosion performance of each Sample E-M was replicated two more times for a total of 3 measurements for each Sample E-M. The mean average of the longest filiform track-length of the 3 measurements for each of Samples E-M and are shown in Table 1.

TABLE 1

| Sample | Phosphonic Acid Weight Percentage (based on the total weight of the fluid) | Fluid pH | Contact time between the fluid and the sample (seconds) | Longest Filiform track length (mean average of 3 samples, mm) |
|---|---|---|---|---|
| E | 0.5 | 1.5 | 10 | 1.57 |
| F | 0.5 | 1.5 | 30 | 1.4 |
| G | 0.5 | 6.5 | 10 | 1.17 |
| H | 0.5 | 6.5 | 30 | 0.87 |
| I | 0.5 | 8.5 | 10 | 0.77 |
| J | 2 | 1.5 | 10 | 1.23 |
| K | 2 | 1.5 | 30 | 1.3 |
| L | 2 | 6.5 | 10 | 0.97 |
| M | 2 | 8.5 | 30 | 0.97 |

Sample G exhibited improved filiform corrosion performance compared to Sample E (25% less mean average filiform track-length). Sample H exhibited improved filiform corrosion performance compared to Sample F (38% less mean average filiform track-length). Sample I exhibited improved filiform corrosion performance compared to Sample E (51% less mean average filiform track-length). Sample L exhibited improved filiform corrosion performance compared to Sample J (21% less mean average filiform track-length). Sample M exhibited improved filiform corrosion performance compared to Sample K (25% less mean average filiform track-length). It is believed that other metallic substrate pretreatment methods according to the present disclosure can also achieve an improvement in filiform corrosion performance.

Samples N and O were substantially equal in size. Samples N and O were prepared in duplicate. Sample N was contacted with a 0.6 weight percent phosphorous acid solution comprising a pH of 1.5, and Sample O was contacted with a 0.6 weight percent phosphorous acid solution comprising a pH of 6.5. After coating Samples N and O with a siloxane coating, the Samples N and O were subjected to a CASS Test according to ASTM B368-09 (2014).

Figure 4A:
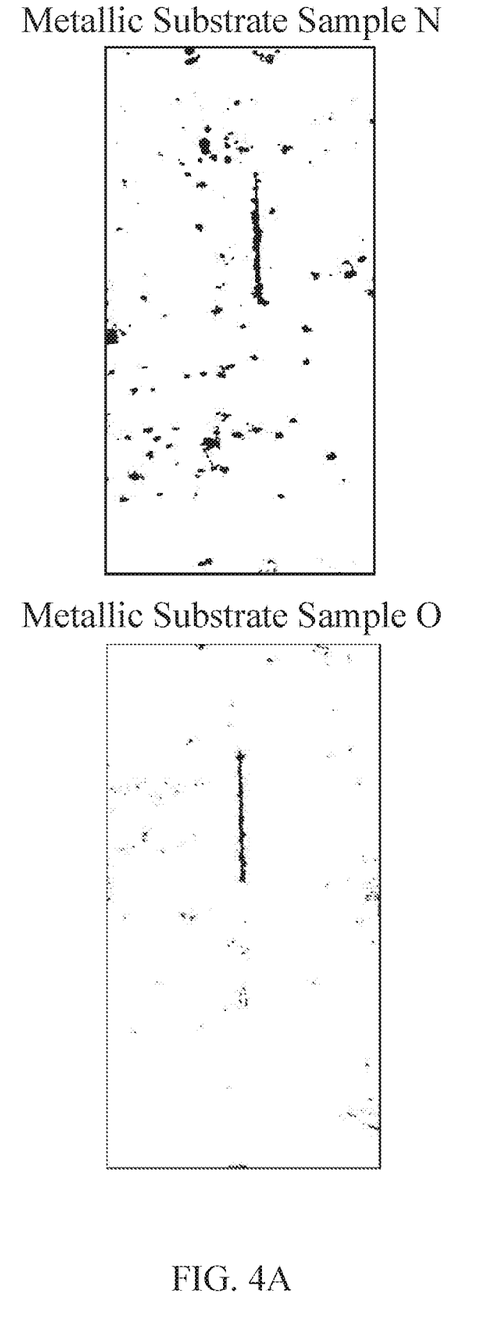
FIG. 4A is a modified image illustrating Samples N and O after CASS testing.
Figure 4B:
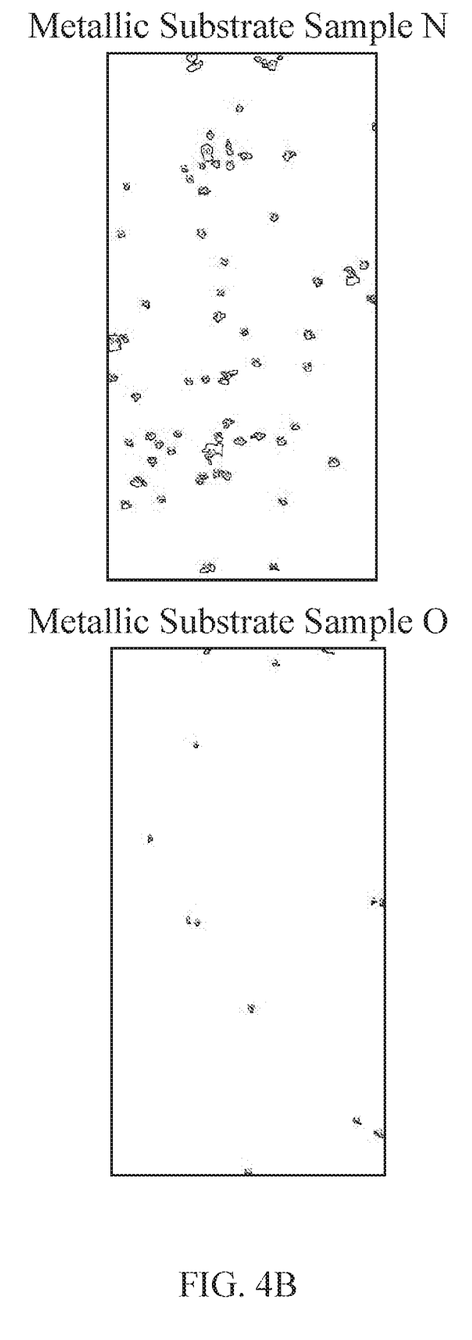
FIG. 4B is a modified image of FIG. 4A selectively illustrating pits formed on the Samples N and O.

Field corrosion (corrosion away from the scribe) on Samples N and O after the CASS test was measured by image analysis. To perform the image analysis, an image of each of Samples N and O was captured and was modified according to similar parameters to emphasize the pitting on each sample. The images are shown in FIG. 4A. The images shown in FIG. 4A were then further modified to selectively enhance the field corrosion, and those further modified images are shown in FIG. 4B. Field corrosion on each of the samples shown in FIG. 4B was measured by counting the pits on a sample and also by measuring the total surface area occupied by all pits on the sample. Sample N had an average of 63 pits and an average total pit surface area of 205 $mm^2$. Sample O had an average of 19 pits, which is an improvement of 70% (based on number of pits) compared to Sample N. Sample O had an average total pit surface area of 35.5 $mm^2$, which is an improvement of 83% compared to Sample N. It is believed that other metallic substrate pretreatment methods according to the present disclosure can also achieve an improvement in field corrosion.

The L* value of each of Samples P-S was measured with a BYK-Gardner Spectro Guide 45/0 Spectrophotometer in the as-polished state. Those L* values are referred to herein as $L^*_1$. Samples P-S were then alkaline cleaned and the L* value of each sample was measured ($L^*_2$) with the BYK-Gardner Spectro Guide 45/0 Spectrophotometer after the alkaline clean.

Samples P-Q were contacted with a 0.6 weight percent phosphorous acid solution. Samples P and R were contacted with a solution comprising a pH of 1.5 while Samples Q and S were contacted with a phosphorous acid solution comprising a pH of 6.5. Samples P and Q were contacted with their respective phosphorous acid solution for 1 minute, and Samples R and S were contacted with their respective phosphorous acid solution for 3 minutes. The L* value each of the Samples P-S was measured ($L^*_3$) with a BYK-Gardner Spectro Guide 45/0 Spectrophotometer after contacting the Samples P-S with the phosphorous acid solutions. After coating each of Samples P-S with a siloxane coating, the L* value of each Sample P-S was measured with a BYK-Gardner Spectro Guide 45/0 Spectrophotometer ($L^*_4$).

The several measured L* values for Samples P-S are provided in Table 2. Table 2 also lists a value $\Delta L^{*'}=|L^*_3-L^*_1|$, as well as a value $\Delta L^{*''}=|L^*_4-L^*_1|$.

TABLE 2

| Sample | $L^*_1$ | $L^*_2$ | $L^*_3$ | $\Delta L^{*'}$ ($|L^*_3-L^*_1|$) | $L^*_4$ | $\Delta L^{*''}$ ($|L^*_4-L^*_1|$) |
|---|---|---|---|---|---|---|
| P | 18.4 | 19.2 | 29.4 | 11 | 32 | 13.6 |
| Q | 19.6 | 20.6 | 19.5 | 0.1 | 22.4 | 1.8 |
| R | 18.6 | 19.7 | 43.3 | 24.7 | 46.3 | 27.7 |
| S | 19.6 | 20.6 | 19.5 | 0.1 | 22.4 | 2.8 |

The $\Delta L^{*'}$ value measured for Sample Q improved upon the $\Delta L^{*'}$ value for Sample P. Specifically, the $\Delta L^{*'}$ value for Sample Q is 99% less than that for Sample P. The $\Delta L^{*'}$ value measured for Sample S improved upon the $\Delta L^{*'}$ value for Sample R. Specifically, the $\Delta L^{*'}$ value for Sample S is 99% less than that for Sample R. It is believed that other metallic substrate pretreatment methods according to the present disclosure can also achieve an improvement in $\Delta L^{*'}$ and/or $\Delta L^{*''}$.

ASPECTS OF THE INVENTION

Various aspects of the invention include, but are not limited to, the aspects listed in the following numbered clauses.

1. A metallic substrate treatment method comprising: contacting a metallic substrate comprising at least one of aluminum and an aluminum alloy with a fluid to form a phosphonate functionalized layer on at least a region of the metallic substrate, the fluid comprising at least one of a phosphonate containing acid and a derivative thereof, wherein the at least one of the phosphonate containing acid and the derivative thereof comprises a pKa of a first acidic proton, and wherein the fluid comprises a pH at least 0.5 pH value greater than the pKa of the first acidic proton.
2. The method of clause 1, wherein the fluid comprises a pH at least 2 pH values greater than the pKa of the first acidic proton.
3. The method of any one of clauses 1-2, wherein the fluid comprises a pH of 11 or less.
4. The method of any one of clauses 1-3, wherein the fluid comprises a pH in a range of 3.5 to 9.5.
5. The method of any one of clauses 1-4, wherein the fluid comprises a pH in a range of 6.5 to 8.5.
6. The method of any one of clauses 1-5, wherein the phosphonate containing acid is at least one of phosphorous acid, phenylphosphonic acid, ethylphosphonic acid, octylphosphonic acid, octadecylphosphonic acid, vinylphosphonic acid, vinylphosphonic acid dimethyl ester, diethylenetriaminepentakis(methylphosphonic acid), octane diphosphonic acid, and derivatives of each such compound.
7. The method of any one of clauses 1-6, wherein the at least one of the phosphonate containing acid and the derivative thereof has the formula wherein $R_1$, $R_2$, and $R_3$ are individually selected from hydrogen, an alkyl, or an aryl.
8. The method of any one of clauses 1-7, wherein the fluid comprises 0.1 weight percent to 20 weight percent, based on the total weight of the fluid, of the at least one of the phosphonate containing acid and derivative thereof.
9. The method of any one of clauses 1-8, wherein the fluid comprises 0.2 weight percent to 5 weight percent, based on the total weight of the fluid, of the at least one of the phosphonate containing acid and derivative thereof.
10. The method of any one of clauses 1-9, wherein the fluid comprises 0.5 weight percent to 2 weight percent, based on the total weight of the fluid, of the at least one of the phosphonate containing acid and derivative thereof.
11. The method of any one of clauses 1-10, wherein contacting the metallic substrate comprises at least one of immersing the metallic substrate in a bath of the fluid, spraying the fluid onto the metallic substrate, and wiping the fluid onto the metallic substrate.
12. The method of clause 11, wherein contacting the metallic substrate comprises immersing the metallic substrate in a bath of the fluid and further comprises agitating the bath of fluid by at least one method selected from the group consisting of bubbling gas through the fluid in the bath and stirring the fluid in the bath.
13. The method of any one of clauses 1-12, wherein the fluid contacts the metallic substrate for a time in a range of 1 second to 40 minutes.
14. The method of any one of clauses 1-13, wherein the fluid contacts the substrate for a time in a range of 5 seconds to 5 minutes.
15. The method of any one of clauses 1-14, wherein the fluid contacts the substrate for a time in a range of 10 seconds to 30 seconds.
16. The method of any one of clauses 1-15, wherein the phosphonate functionalized layer comprises a phosphonate group bonded to the metallic substrate.
17. The method of any one of clauses 1-16, wherein a CIELAB lightness difference (ΔL*) between the metallic substrate comprising the phosphonate functionalized layer and the metallic substrate without the phosphonate functionalized layer is no greater than 10, as measured with a BYK-Gardner Spectro Guide 45/0 Spectrophotometer.
18. The method of any one of clauses 1-17, further comprising, prior to contacting the metallic substrate: cleaning the metallic substrate, wherein cleaning comprises at least one of an alkaline cleaning, an acid cleaning, and a carbon dioxide based cleaning technique.
19. The method of any one of clauses 1-18, further comprising depositing a coating layer over at least a portion of the phosphonate functionalized layer on the metallic substrate.
20. The method of clause 19, wherein the coating layer comprises at least one of a siloxane, a silazane, a fluoropolymer, an acrylic, an epoxy, a polyester, and a polyurethane.
21. The method of any one of clauses 1-20, wherein an article including the metallic substrate is configured as at least one of an aerospace component, an automotive component, a transportation component, and a building and construction component.
22. The method of clause 21, wherein the article including the metallic substrate is a vehicle wheel.
23. An article comprising;
 a metallic substrate comprising aluminum or an aluminum alloy; and
 a phosphonate functionalized layer on at least a region of the metallic substrate.
24. The article of clause 23, wherein the phosphonate functionalized layer comprises a phosphonate group bonded to the metallic substrate.
25. The article of any one of clauses 23-24, further comprising a coating deposited over at least a region of the phosphonate functionalized layer.
26. The article of clause 25, wherein the coating comprises at least one of a siloxane, a silazane, a fluoropolymer, an acrylic, an epoxy, a polyester, and a polyurethane.
27. The article of any one of clauses 23-26, wherein the article is configured as at least one of an aerospace component, an automotive component, a transportation component, and a building and construction component.
28. The article of any one of clauses 23-26, wherein the article is a vehicle wheel.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:
1. A metallic substrate treatment method comprising:
 contacting a metallic substrate comprising at least one of aluminum and an aluminum alloy with a fluid to form a phosphonate functionalized layer on at least a region of the metallic substrate, the fluid comprising at least one of a phosphonate containing acid and a derivative thereof,
wherein the at least one of the phosphonate containing acid and the derivative thereof comprises a pKa of a first acidic proton, and wherein the fluid comprises a pH in a range of 5.5 to 8.5 and at least 0.5 pH value greater than the pKa of the first acidic proton,
wherein the fluid comprises 0.1 weight percent to 20 weight percent, based on the total weight of the fluid, of the at least one of the phosphonate containing acid and derivative thereof.

2. The method of claim 1, wherein the fluid comprises a pH at least 2 pH values greater than the pKa of the first acidic proton.

3. The method of claim 1, wherein the fluid comprises a pH in a range of 6.5 to 8.5.

4. The method of claim 1, wherein the phosphonate containing acid is at least one of phosphorous acid, phenylphosphonic acid, ethylphosphonic acid, octylphosphonic acid, octadecylphosphonic acid, vinylphosphonic acid, vinylphosphonic acid dimethyl ester, diethylenetriaminepentakis(methylphosphonic acid), octane diphosphonic acid, and derivatives of each such compound.

5. The method of claim 1, wherein the at least one of the phosphonate containing acid and the derivative thereof has the formula wherein $R_1$, $R_2$, and $R_3$ are individually selected from hydrogen, an alkyl, and an aryl.

6. The method of claim 1, wherein the fluid comprises 0.2 weight percent to 10 weight percent, based on the total weight of the fluid, of the at least one of the phosphonate containing acid and derivative thereof.

7. The method of claim 1, wherein contacting the metallic substrate comprises at least one of immersing the metallic substrate in a bath of the fluid, spraying the fluid onto the metallic substrate, and wiping the fluid onto the metallic substrate.

8. The method of claim 7, wherein contacting the metallic substrate comprises immersing the metallic substrate in a bath of the fluid and further comprises agitating the bath of fluid using at least one method selected from the group consisting of bubbling gas through the fluid in the bath and stirring the fluid in the bath.

9. The method of claim 1, wherein the fluid contacts the metallic substrate for a time in a range of 1 second to 40 minutes.

10. The method of claim 1, wherein the phosphonate functionalized layer comprises a phosphonate group bonded to the metallic substrate.

11. The method of claim 1, wherein an International Commission on Illumination L*a*b* lightness difference (ΔL*) between the metallic substrate comprising the phosphonate functionalized layer and the metallic substrate without the phosphonate functionalized layer is no greater than 10, as measured with a BYK-Gardner Spectro Guide 45/0 Spectrophotometer.

12. The method of claim 1, further comprising, prior to contacting the metallic substrate:
cleaning the metallic substrate, wherein cleaning comprises at least one of an alkaline cleaning, an acid cleaning, and a carbon dioxide based cleaning technique.

13. The method of claim 1, further comprising depositing a coating layer over at least a portion of the phosphonate functionalized layer on the metallic substrate.

14. The method of claim 13, wherein the coating layer comprises at least one of a siloxane, a silazane, a fluoropolymer, an acrylic, an epoxy, a polyester, and a polyurethane.

* * * * *